July 7, 1959  R. W. LAWHORN ET AL  2,894,252
ENGINE PERFORMANCE METER
Filed March 18, 1955  2 Sheets-Sheet 1

Inventors
ROGER W. LAWHORN
CHARLES A. WOODCOCK
SHERMAN E. WOMACK

Attys

July 7, 1959
R. W. LAWHORN ET AL
2,894,252
ENGINE PERFORMANCE METER
Filed March 18, 1955
2 Sheets-Sheet 2
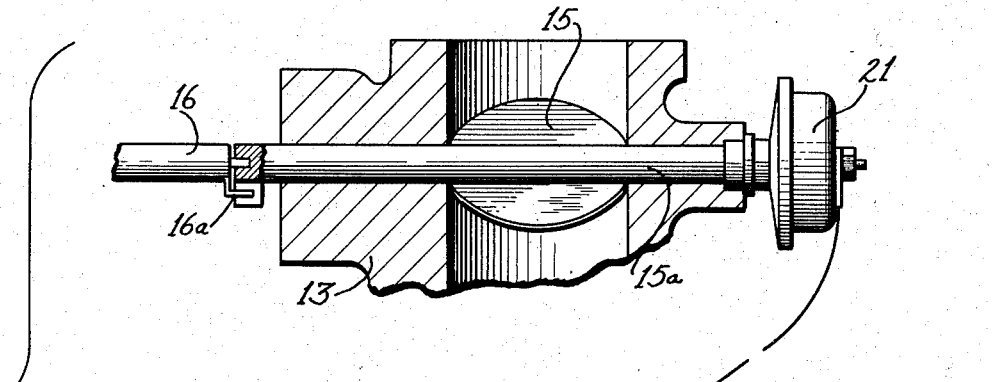
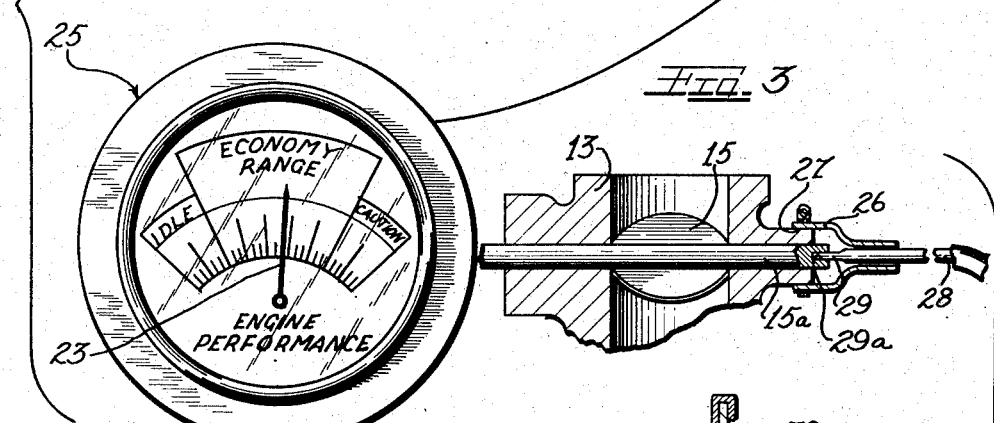
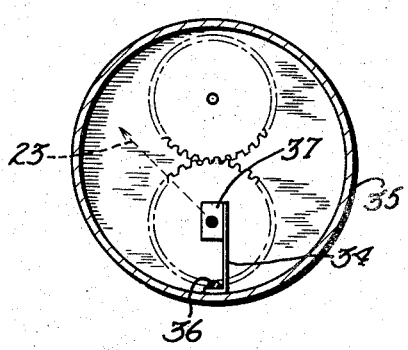
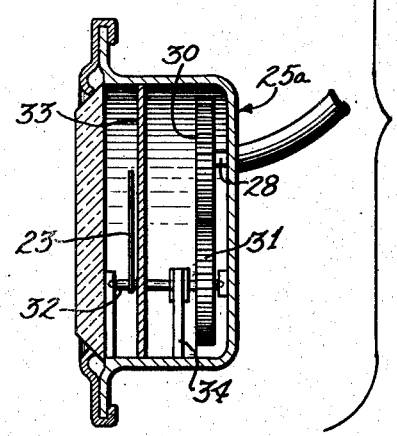
Inventors
ROGER W. LAWHORN
CHARLES A. WOODCOCK
SHERMAN E. WOMACK

United States Patent Office 2,894,252
Patented July 7, 1959

2,894,252

ENGINE PERFORMANCE METER

Roger W. Lawhorn, Elvaston, and Charles A. Woodcock and Sherman E. Womack, Springfield, Ill., assignors, by mesne assignments, to Stewart-Warner Corporation, Chicago, Ill., a corporation of Virginia Application March 18, 1955, Serial No. 495,174

1 Claim. (Cl. 340—282)

The present invention relates to apparatus for providing an instantaneous indication of engine condition and is, more particularly, concerned with the accurate sensing of the throttle opening of an internal combustion engine or the like under all operating conditions.

As those skilled in the automotive arts are aware, the actual performance of an internal combustion engine under load is rarely known to the operator. The instruments conventionally associated with such vehicular units as tractors, trucks, and automobiles, include speedometers, tachometers, engine-hour meters, oil pressure and temperature gauges but they do not include any gauge capable of indicating an overall engine performance condition. Furthermore, there are few vehicle operators capable of integrating the information available on the conventional gauges into an accurate picture of engine performance. Thus, while the operator may feel sure that the performance of his vehicle is deteriorating he will have no actual knowledge of such a condition until it is too late for satisfactory preventive action. Further, while it is generally agreed that operation of any loaded vehicle may most efficiently be carried out at a predetermined engine condition, none of the prior art gauges are capable of indicating such a condition to the vehicle operator and accordingly most modern vehicle operation occurs under inefficient engine conditions.

The apparatus of the present invention provides an accurate indication of the instantaneous operating condition of a vehicular power plant and is applicable to any power plant utilizing a pressurized fluid under the control of a throttle and where an engine speed governor may be applied. In accordance with the present invention, an indicator is provided on the vehicle instrument panel which accurately indicates the exact opening of the throttle. For convenience sake, this throttle opening gauge is calibrated in ranges of vehicular operation, such as for example "idle," "economy range" and "caution-overload." In adidtion to the above mentioned gauge, the throttle is connected to an engine speed governor such that the desired engine speed may be preset and upon an overload, with resultant instantaneous speed decrease, the throttle will be opened and, alternatively, upon an instantaneous load relief with resultant instantaneous speed increase, the throttle will be closed to return the engine to its preset operating speed of rotation.

As a result of the correlated use of the governor controlled throttle and throttle positioned indicator an accurate check may be kept of the engine's operating characteristics on given jobs. Further, the optimum transmission ratio for any particular job may accurately be determined, with the result that engine life may be extended by preventing undesirable engine lugging which occurs when the engine is operating at its full load condition.

For example, a tractor incorporating the apparatus of the present invention may be started on a job, such as plowing for example. By adjusting the engine speed and the gearing until the throttle position is approximately 80° open as indicated by the high side of the "economy" range of the indicator maximum fuel economy is achieved and minimum of engine wear is encountered since the engine is provided with the 20% throttle safety factor which is sufficient under ordinary situations to prevent the probability of any lugging of the engine. If, during operation of the tractor on the job it becomes apparent that the gearing and speed selected are insufficient to maintain the throttle at or below the 80% open position, and the throttle is required to position itself at a more open position in order to maintain the predetermined engine speed under the load conditions imposed the gear ratio may be modified, and the engine speed increased to return the tractor to the proper operating conditions.

Since such items as tractors, trucks and other similar commercial vehicles are called upon to perform the same tasks over and over, the general overall condition of the engine may readily be checked at any time. This is the case since if it is known at what throttle opening, or indicator position, the vehicle will operate to provide a given engine speed at a predetermined gear ratio under a particular load condition when the vehicle is in new or known condition, the instantaneous condition of the engine may be determined by providing the known load and adjusting the engine speed and gear ratios to the known condition. Then, if operating under such conditions the indicator indicates that the throttle is required to be positioned at a more open position than when new, the engine is not performing at par. In this manner motor degeneration may readily be followed and preventive maintenance may be undertaken before motor wear has advanced to such a stage that complete overhaul is necessitated. This is an important feature since it is well known that deterioration of an engine accelerates rapidly after the parts reach a predetermined wear level. By being able to ascertain the engine's condition at any time, the engine may be maintained in proper condition at a minimum of expense by making necessary repairs before the advanced wear conditions occur.

It is therefore an object of the present invention to provide a novel engine condition indicating apparatus.

Another object of the present invention is to provide a means whereby the exact position of the engine throttle may be visually determined at any instant.

Still a further object of the present invention is to provide an overall engine condition indicator associated with a governor controlled throttle.

Yet a further object of the invention resides in the provision of a direct reading indicator which accurately shows the exact throttle opening of an engine whereby the reserve power of the engine is known at all times.

A feature of the invention is a gauge mounted on the vehicle dashboard and directly connected, mechanically or electrically, to the end of the engine throttle shaft whereby the angular position of the throttle shaft may visually be determined from the driver's seat.

Still other and further objects and features of the present invention will at once become apparent to those skilled in the art from a consideration of the attached drawings illustrating two preferred embodiments of the present invention by way of illustration only and wherein:

Figure 2 is an enlarged fragmental view of the engine throttle, governor connection and indicator of the electrical type;

Figure 3 is an enlarged fragmental view in elevation of the engine throttle and gauge interconnected by means of a mechanical linkage; and Figure 4 is a view of the gauge shown in Figure 3 taken along the line IV—IV and illustrating the gauge centering means herein provided.

As shown on the drawings:

Figure 1:
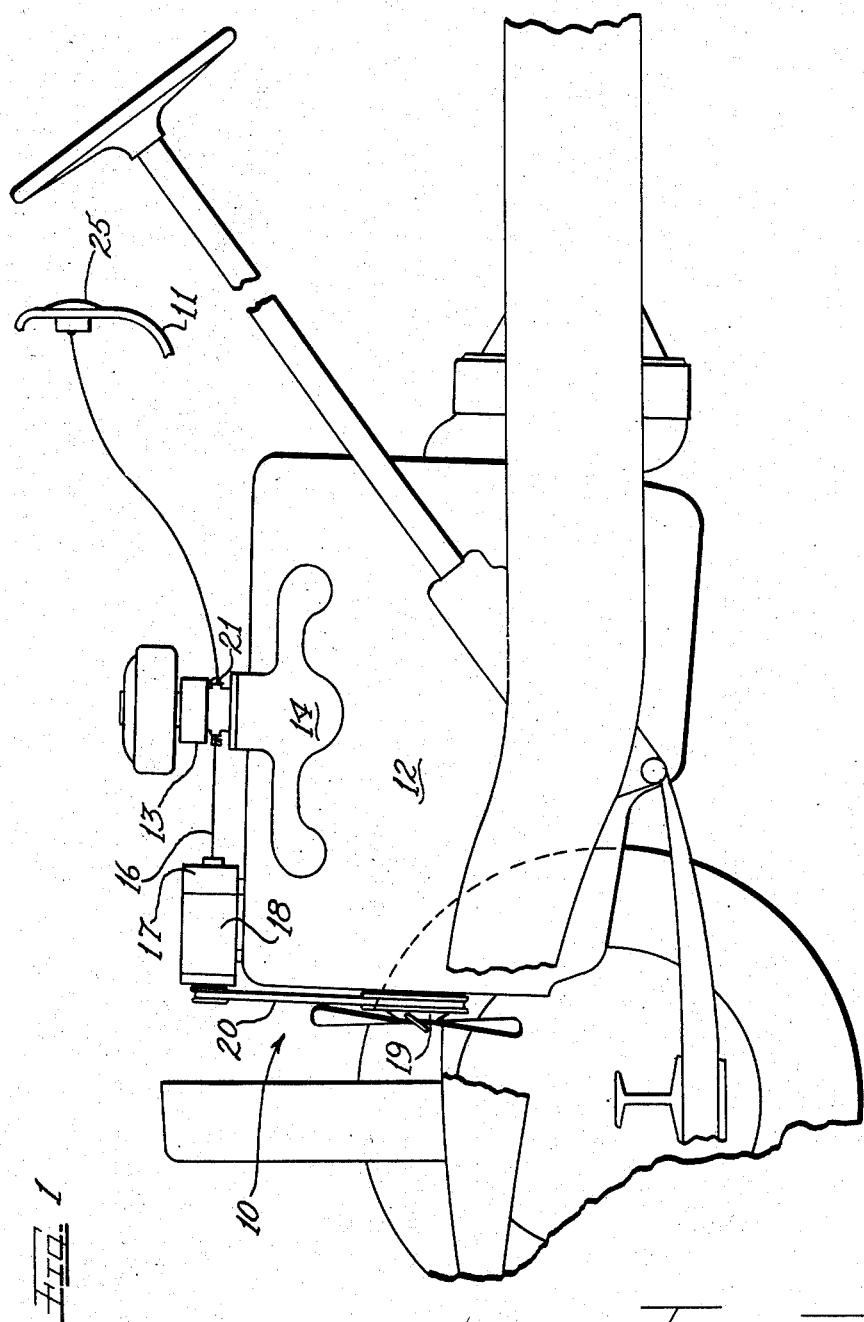
Figure 1 is an elevational view of a conventional vehicle illustrating the attachment of the apparatus of the present invention thereto.

As may be seen from a consideration of Figure 1, the apparatus of the present invention may be installed on a conventional vehicle, such as for example a tractor, having an engine compartment 10 and a dashboard or gauge panel 11. In the installation shown, the engine 12 is provided with a carburetor 13 secured to the intake manifold 14. The throttle plate 15 may be actuated by a mechanical, manual, linkage of conventional design, not shown, and is, according to the present invention, directly coupled to the output shaft 16 of a governor 17 driven in any conventional manner but here shown associated with the engine driven generator 18 driven by the engine crankshaft 19 through a belt 20.

The governor 17 is, as above noted, of any conventional design and per se forms no part of the present invention. Any conventional governor is satisfactory as long as it is constructed to maintain a predetermined engine speed by continually sensing the engine speed and opening the throttle upon a decrease in engine speed below the set value and, conversely, closing the throttle upon an increase above the set value. At the opposite end of the throttle shaft 15a, a gauge driving mechanism is secured. In the modification shown in Figure 2, this sensing unit takes the form of an electrical position sensing control switch 21. This sensing element is preferably of the type commonly associated with gas tank gauges and comprises a bimetallic sending unit such as manufactured by King-Seeley or a variable resistance rheostat as manufactured by General Motors Corporation.

In the case of the King-Seeley type sending unit a corresponding bimetallic receiving unit is provided in the dash indicator for actuating the needle 23 in response to an increase in angular deflection of the shaft 15a. In the case of a General Motors type sending unit wherein a variable rheostat is provided, a galvanometer type gauge unit is provided at the dash panel 11 for actuating the needle 23 in response to variations in current resulting from the change in resistance in the circuit occasioned by the rheostat attached to the shaft 15a. Both the King-Seeley and General Motors Corporation type gauge units are conventional as to their operative parts and either unit is satisfactory for providing an electrical indicator on the dash panel 11 responsive to the exact angular position of the shaft 15a. It will, of course, be understood that any electrical position-responsive sending unit and gauge combination may be utilized within the scope of the present invention and the above two types are merely mentioned for purposes of illustration.

The gauge or indicator driven by the receiving unit and having an indicator needle 23, is generally shown at 25. It includes a dial or indicia bearing face generally as shown in Figure 2 and having a portion marked "idle," a portion marked "economy range" and a third portion marked "caution-overload." Effectively, these ranges read, from left to right, with increasing throttle opening with the throttle substantially closed at the extreme left and fully open at the extreme right. It will be understood, of course, that these ranges indicate general overall engine economy and are not intended as indicative of the most efficient gasoline mileage obtaining range. Although some studies have indicated that maximum gasoline mileage may be obtained at full throttle, the full throttle condition is unsatisfactory for continued use because of the tendency of the engine to lug causing irregular power applications to the drive system and accordingly increasing engine life and wear. For ordinary purposes the optimum position of the indicating needle 23 would be on the high side or right hand side of the economy range on the gauge dial.

In the modifications shown in Figure 3, a direct mechanical linkage is provided between the throttle shaft 15a and the gauge 25a. This mechanical connection comprises a flexible shaft having a housing 26 secured to the carburetor fixed flange 27, and a rotatable flexible shaft 28 drivingly connected to the shaft 15a by means of a square portion 29 inserted in a rectangular bore 29a in the shaft 15a. The shaft 28 is connected at its opposite end to a drive gear 30 which in turn rotates a needle drive gear 31. The gear 31 is fixed to needle shaft 32 and carries fixedly secured thereto the needle 23 positioned in front of the dial surface 33. The needle 23 is biased into the left hand or idle position by means of any conventional biasing spring means. A satisfactory method is illustrated in Figures 3 and 4 wherein a spring leaf 34 is fixedly secured to the outer casing 35 of the gauge 25 by means of a rivet, screw, or the like 36. The shaft 32 carries a rectangular spring engaging abutment element 37 bearing an angular relationship relative to the needle 23 as shown in Figure 4 wherein the needle 23 is outlined in dotted lines. Movement of the needle in a clockwise direction as used in Figure 4 will cause a deflection of the spring 34 to an increasingly greater extent as the arrow swings from the "idle" to the extreme right hand position. In the mechanical system this spring aids in returning the throttle to its closed position and accordingly prevents any interference with the normal throttle action of the carburetor which might otherwise be occasioned as a result of inertias and friction loads present in the flexible shaft 28 and housing 26.

In operation, the governor 17 is drivingly connected to the throttle shaft 15a by means of the shaft 16 and a coupling 16a. The sending unit 21, or the housing 26, are then secured to the carburetor at the opposite end of the throttle shaft 15a and the respective receiving units 25 or 25a is mounted in a visible position on the vehicle instrument panel. Adjustment of the gauge is made to provide for positioning of the needle 23 at the extreme left hand position of the dial, as viewed in Figure 2, when the vehicle throttle is completely closed. By appropriate selection of the electrical rheostat or bimetallic elements at the sending unit 21, or alternatively through the selection of direct drive mechanical cable means such as 28 without subsequent gear reduction, the needle 23 may be actuated to operate to the full scale position when the throttle is fully open. With the parts thus installed the operation of the device is continuous and automatic and will provide an accurate overall indication of instantaneous engine performance at all times.

It will thus be understood that we have provided a novel and improved engine condition sensing and indicating apparatus capable of providing an overall indication of engine condition heretofore unavailable. It will be understood that modifications and variations may be made in the above set forth structure without departing from the scope of the novel concepts of the present invention and accordingly we do not intend to be limited otherwise than as necessitated by the appended claim.

We claim as our invention:

In combination with an engine having a throttle, a governor connected to said throttle and responsive to engine speed to decrease the opening of said throttle when said engine speed increases above a predetermined value and to increase the opening of said throttle when said engine speed decreases below the predetermined value, sensing means for determining the degree of opening of said throttle and indicator means controlled by said sensing means and positioned in view of the engine operator for indicating on a dial during operation of the engine the degree of throttle opening required to maintain a predetermined governor controlled engine speed, said dial having indicia thereon indicating approximately 0% to 20% of throttle opening as an "idle" range, approximately 20% to 80% of throttle opening as an "economy" range and approximately 80% to 100% of throttle opening as a "caution-overload" range.

References Cited in the file of this patent

UNITED STATES PATENTS

| | | |
|---|---|---|
| 1,031,223 | Winton | July 2, 1912 |
| 1,394,015 | Horvath | Oct. 18, 1921 |
| 1,868,523 | De Florez | July 26, 1932 |
| 2,330,388 | Scott-Paine | Sept. 28, 1943 |
| 2,354,888 | Smith | Aug. 1, 1944 |